(12) United States Patent
Li et al.

(10) Patent No.: US 12,378,458 B1
(45) Date of Patent: Aug. 5, 2025

(54) PHASE CHANGE MICROCAPSULE FOR DRILLING FLUID COOLING AND ITS PREPARATION METHOD AND APPLICATION

(71) Applicant: CHINA UNIVERSITY OF PETROLEUM (EAST CHINA), Qingdao (CN)

(72) Inventors: Mei-Chun Li, Qingdao (CN); Ziyan Li, Qingdao (CN); Jinsheng Sun, Qingdao (CN); Kaihe Lv, Qingdao (CN); Jingping Liu, Qingdao (CN); Yingrui Bai, Qingdao (CN); Xianbin Huang, Qingdao (CN); Jintang Wang, Qingdao (CN); Jiafeng Jin, Qingdao (CN); Jian Li, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/752,891

(22) Filed: Jun. 25, 2024

(30) Foreign Application Priority Data

Feb. 6, 2024 (CN) .......................... 202410166589.6

(51) Int. Cl.
*C09K 5/06* (2006.01)
*B01J 13/02* (2006.01)

(52) U.S. Cl.
CPC ............... *C09K 5/063* (2013.01); *B01J 13/02* (2013.01); *B01J 13/025* (2013.01)

(58) Field of Classification Search
CPC . B01J 13/02; B01J 13/025; B01J 13/04; B01J 13/043; B01J 13/20; B01J 13/206; C09K 5/02; C09K 5/06; C09K 5/063; C09K 5/066; C09K 8/032; C09K 8/36; Y02E 60/14
See application file for complete search history.

(56) References Cited

U.S. PATENT DOCUMENTS

| 2018/0185809 | A1 | 7/2018 | Walters et al. | |
| 2020/0216737 | A1* | 7/2020 | Mcneil | A61K 9/70 |
| 2021/0130670 | A1* | 5/2021 | Shuster | C08L 23/16 |
| 2021/0340423 | A1* | 11/2021 | Li | C09K 5/063 |

FOREIGN PATENT DOCUMENTS

| CA | 2178262 C | * | 8/2006 | ............. A01N 25/28 |
| CN | 108504336 A | * | 9/2018 | ............. C09K 5/063 |
| CN | 112934135 A | * | 6/2021 | ............. B01J 13/06 |
| CN | 113429942 A | * | 9/2021 | |
| CN | 113980656 A | * | 1/2022 | |
| CN | 113980660 A | * | 1/2022 | |
| CN | 114525111 A | * | 5/2022 | |
| CN | 114703693 A | * | 7/2022 | |
| JP | 2023049925 A | * | 4/2023 | |
| KR | 2017141967 A | * | 12/2017 | ........... C04B 14/005 |
| KR | 2023162294 A | * | 11/2023 | ........... C04B 41/483 |

OTHER PUBLICATIONS

Gamelas et al. ("On the morphology of cellulose nanofibrils obtained by TEMPO-mediated oxidation and mechanical treatment", Micron, 72, 2015, 28-33) (Year: 2015).*
Mitran et al. ("Shape-stabilized phase change materials using molten $NaNO_3$—$KNO_3$ eutectic and mesoporous silica matrices", Solar Energy Materials & Solar Cells, 215, 2020, 10644) (Year: 2020).*
Yazdani et al. ("Cellulose Nanofibrils Endow Phase-Change Polyethylene Glycol with Form Control and Solid-to-gel Transition for Thermal Energy Storage", ACS Appl. Mater. Interfaces, 2021, 13, 2188-6200) (Year: 2021).*
Lee et al. ("Nanoencapsulation of binary nitrate molten salts for thermal energy storage: Synthesis, thermal performance, and thermal reliability", Solar Energy Materials & Solar Cells, 230, 2021, 111284) (Year: 2021).*
Kaya et al. ("Microencapsulated phase change material via pickering emulsion stabilizing by cellulose nanofibrils for thermal energy storage", Carbohydrate Polymers, 276, 2022, 118745) (Year: 2022).*
Li Meichun et al., "Research Progress and Prospects on the Application of Biomass-Based Nanomaterials in Drilling Fluids" «World Petroleum Industry> vol. 30, Issue 6: 53-68 Publication Date:Dec. 31, 2023.

\* cited by examiner

*Primary Examiner* — Matthew R Diaz
(74) *Attorney, Agent, or Firm* — CBM PATENT CONSULTING, LLC

(57) ABSTRACT

A phase change microcapsule for drilling fluid cooling and its preparation method and application, belonging to the field of oilfield chemistry technology; the preparation method of the phase change microcapsule of the invention includes the steps as follows: the core materials of $NaNO_3$ and $KNO_3$ are dried, heated, melted, cooled and ground to obtain a phase change material mixture; added emulsifier into the linseed oil, then heated and stirred to obtain the oil phase; the phase change material mixture were added into the suspension of cellulose nanofibers (CNFs), then stirred followed by adding ammonium hydroxide to obtain the water phase; mixed the water phase with the oil phase, heated and stirred to form water-in-oil (W/O) emulsion; then added shell prepolymer material (tetraethyl silicate) into the emulsion, after centrifugation, washing and drying, the phase change microcapsule for cooling drilling fluid was obtained.

7 Claims, 1 Drawing Sheet

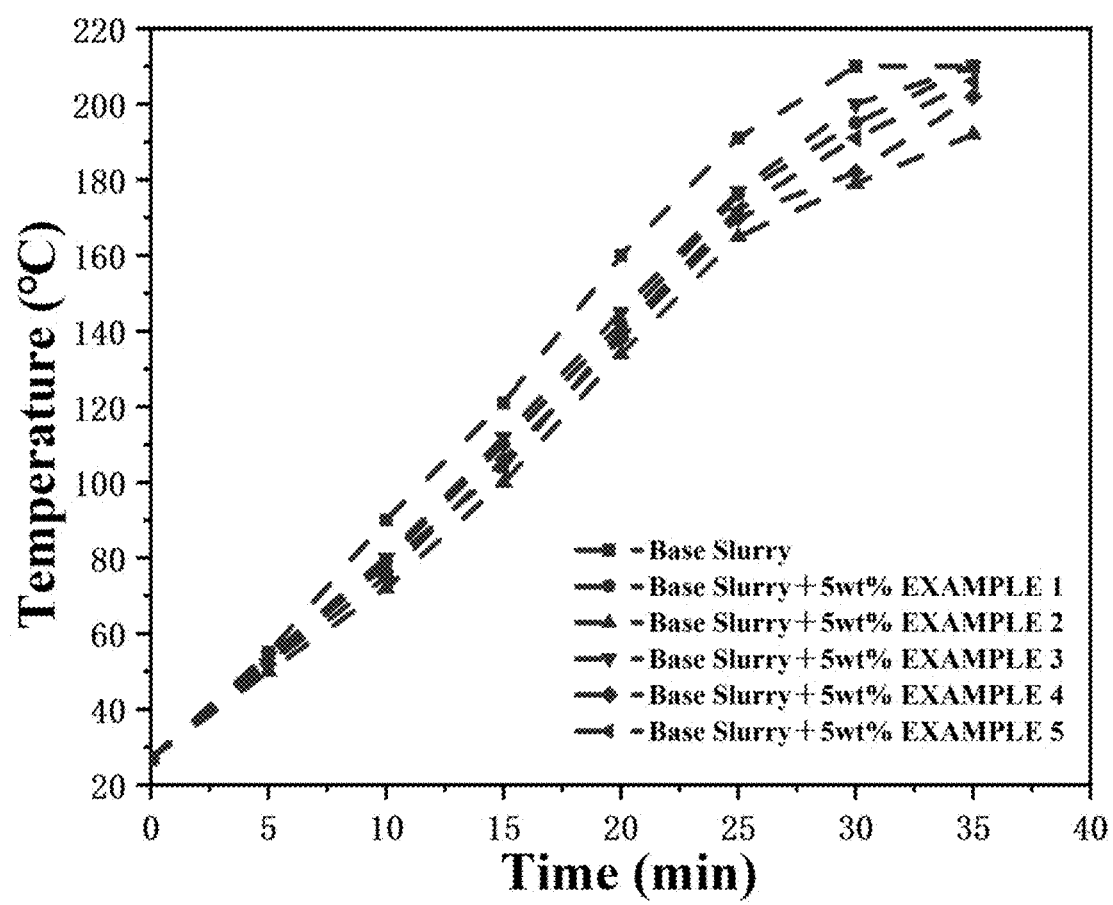

PHASE CHANGE MICROCAPSULE FOR DRILLING FLUID COOLING AND ITS PREPARATION METHOD AND APPLICATION

CROSS-REFERENCE TO RELATED APPLICATIONS

This application claims priority to Chinese Patent Application Ser. No. CN2024101665896 on 6 Feb. 2024.

FIELD OF THE INVENTION

The invention belongs to the technical field of oilfield chemistry, and specifically relates to a phase change microcapsule for cooling drilling fluid and its preparation method and application.

BACKGROUND OF THE INVENTION

With the continuous improvement of oil and gas exploration and development, it is increasingly difficult to discover oil and gas resources in medium and shallow layers. The trend of global oil and gas exploration and development turning to deep and ultra-deep layers is becoming increasingly obvious. At present, oil exploration in our country faces large challenges of being deep (large burial depth), steep (large formation inclination angle), narrow (narrow pressure window), thick (complex layers such as gravel layer and salt layer), difficult (many accidents, poor drillability), and harsh (high temperature, high pressure, high acidity). Deep and ultra-deep drilling is faced with serious high and ultra-high temperature problems. The bottom hole temperature during drilling reaches 17-190° C., and goes to even as high as 200° C. in some areas. The ultra-high temperature environment damages the performance of drilling fluids, leading to difficulties in carrying normal drilling conditions.

Generally, surface cooling method is often used to solve the problem of ultra-high temperature encountered in drilling. It can decrease the circulating temperature of wellbore drilling fluid by decreasing the temperature at the entrance of the drilling fluid, however, the cooling effect is not obvious and the equipment investment is large. Therefore, the method is difficult to meet the cooling demand of oil and gas exploration and development in ultra-deep formations.

The phase change materials (PCMs), also called latent heat storage materials, have the ability to store and release energy by forming and destroying intermolecular chemical bonds. As the temperature reaches their phase transition temperature, PCMs undergo phase change, and the stored heat energy of PCMs is released. PCMs are expected to be applied into the drilling field to decrease the wellbore temperature, which can prevent the decline in the performance of drilling fluid under high temperatures, ensuring safe and efficient development of oil and gas resources in ultra-deep formations. However, PCMs have some disadvantages which include having low thermal conductivity and poor thermal stability, which can cause it to easily leak, and damage the properties of PCMs.

To solve the problem of leakage of PCMs, this research found that the PCM encapsulated to phase change microcapsules not only prevent the leakage but also results in the formation of micro or nanoscale microcapsules. When used for drilling operations, the microcapsule can pass through the drilling fluid vibrating screen, and can be reused with the drilling fluid cycle, showing great application prospects. In addition, there have been several studies on the preparation of phase change microcapsules. For instance, the Chinese patent document CN111013509A discloses an inorganic salt phase change energy storage microcapsule, in which the core material consisted of inorganic salt, and the polymer or doped polymer was used as shell material; the Chinese patent document CN107523273A discloses alkane and ester materials as core material and polyacrylate as shell material to prepare a polyacrylate phase change microcapsule. The Chinese patent document CN115491183A discloses a high-temperature phase change microcapsule, in which the core material is organic polymer phase, and the shell material is silica. Another Chinese patent CN113249097A discloses alkanes and ester as core materials and polyacrylate as shell material to prepare a polyacrylate phase change microcapsule. The phase change microcapsule CN113249097A showed great performance, but the phase transition temperature of the microcapsule is significantly lower than the bottom hole temperature observed during drilling in ultra-deep formations. Furthermore, the latent heat value of this microcapsule was also found to be low and cannot meet the drilling conditions of ultra-deep formations. However, with the rapid development of oil and gas exploration technology, drilling operations gradually penetrate deeper into the subsurface, the actual drilling temperature reaches 200° C. or even higher, while the phase transition temperature of most phase change microspheres is 130-150° C. much lower than the bottom hole temperature, and cannot solve the problem of high temperature at the bottom of the well. In addition, the patents mentioned above take high-pressure spray to modify core material, and the experiment involve a high temperature and high-pressure reactor, the experimental steps are cumbersome, and reaction conditions are also hazardous. Moreover, the encapsulation efficiency of the core material has also not been evaluated, which has an important impact on the phase transition temperature and performance of the phase change microspheres.

The problem of drilling fluid performance failure caused by ultra-high temperatures at the bottom of the wellbore has not been solved yet. Therefore, developing new technologies to reduce the drilling fluid temperature is of utmost importance.

SUMMARY OF THE INVENTION

Given the shortcomings of the existing technology, especially the problem of high formation temperature during the drilling of ultra-deep formations, this invention provides a phase change microcapsule for drilling fluid cooling and its preparation method and application. With the deepening of the drilling depth, the drilling fluid temperature rises, when the temperature reaches a certain value, the core material of the phase change microcapsule actively absorbs heat, so as to cool the drilling fluid and ensure normal drilling activities.

MODES FOR PRACTICING THE INVENTION

The preparation method of a phase change microcapsule for drilling fluid cooling comprises the following steps:

(1) The core materials of $NaNO_3$ and $KNO_3$ are dried, heated, melted, cooled, and ground to obtain a phase change material mixture;

(2) Emulsifier is added into the linseed oil, then heated and stirred to obtain the oil phase;

(3) The phase change material mixture is added into the suspension of cellulose nanofibers (CNFs), then stirred followed by adding ammonium hydroxide to obtain the water phase;

(4) The water phase is mixed with the oil phase, heated, and stirred to form a water-in-oil (W/O) emulsion; then shell prepolymer material (tetraethyl silicate) is added into the emulsion, and after centrifugation, washing, and drying, the phase change microcapsule for cooling drilling fluid is obtained.

According to the invention, it is preferred that the mass ratio of $NaNO_3$ to $KNO_3$ in the core material in step (1) is 3:1-5, more preferably 3:2-4; the mass ratio of the core materials $NaNO_3$ and $KNO_3$ should be controlled within the aforementioned range. If the mass ratio of $NaNO_3$ and $KNO_3$ is low, the phase transition temperature of the phase change microcapsule cannot meet the requirement of the temperature of the drilling fluid during drilling operations, and the cooling effect will not be obvious. On the contrary, higher mass ratio of $NaNO_3$ and $KNO_3$ will result in phase transition temperature of the phase change microcapsule being higher than the temperature of the drilling fluid during drilling operations, and the phase change microcapsule will not undergo phase change behavior and have no cooling effect.

According to the invention's preferred embodiment, the drying temperature in step (1) is 150-170° C., and the drying time is 10-15 h.

According to the invention's preferred embodiment, the heating and melting temperature in step (1) is 400-500° C., and the heat preservation time is 8-12 h; the cooling is natural cooling to room temperature.

According to the invention's preferred embodiment, the emulsifier in step (2) is span 80; the concentration of the emulsifier in the oil phase is 1-10 mg/mL, and more preferably 5-8 mg/mL.

According to the invention's preferred embodiment, the temperature of heating and stirring in step (2) is 55-65° C., the time of heating and stirring is 20-40 min, and the speed of heating and stirring is 1000-2000 rpm.

According to the invention's preferred embodiment, the concentration of the CNF suspension in step (3) is 0.006-0.01 g/mL; The invention stabilizes the emulsion system by adding a specific amount of CNFs, the inherent amphiphilicity and high aspect ratio of CNFs enable them to be adsorbed on the surface of droplets and form the dense structure around adjacent droplets to fix the droplets and improve the stability of the emulsion, and further improve the encapsulation efficiency of the phase change microcapsule. The concentration of CNFs should be controlled within a reasonable range. Addition of high concentration of CNFs can increase the viscosity of the system which is not conducive to droplet diffusion, and can result in decrease in the emulsification ability. With the addition of a small concentration of CNFs, the viscosity of the system will be lower, however, the CNFs will be unable to form a dense network structure to capture droplet particles, which will cause the phase separation of the emulsion. In addition, CNFs also have the advantages of high mechanical strength, good biodegradability, and biocompatibility, which have a reinforcing effect on the microcapsule.

According to the invention's preferred embodiment, the CNF suspension is prepared according to the following method:

The *eucalyptus* powder was dispersed into deionized water, followed by adding 2,2,6,6-tetramethylpiperidine oxide (TEMPO), sodium bromide, and sodium hypochlorite solution, the mixture was stirred at room temperature for 4 h. Then hydrochloric acid solution (0.1 mol/L) and sodium hydroxide solution (mass fraction of 10-30%) was used to adjust the solution pH to 10-10.5. After the reaction was completed, three times the volume of ethanol was added to quench the reaction. The mass ratio of *eucalyptus* powder to the volume of deionized water was 1 g: 100 mL, the mass ratio of TEMPO to *eucalyptus* powder was 0.01-0.02:1, the mass ratio of sodium bromide to *eucalyptus* powder was 0.05-0.15:1, the mass ratio of sodium hypochlorite solution to *eucalyptus* powder was 6-7:1, and the mass fraction of sodium hypochlorite solution was 5-6%. Afterward, centrifuge washing was performed to collect the sediment, which was then dispersed in deionized water, and after ultrasonic treatment, the CNF suspension was obtained. The concentration of CNF suspension was 0.006-0.01 g/mL; the power of the ultrasonic treatment was 800 W, and the ultrasonic time was 30-60 min, Finally, the concentration of CNF suspension was calculated by weighing the solids after drying a known volume of suspension at 60-80° C.

According to the invention's preferred embodiment, the ratio of the mass of phase change material mixture to the volume of the CNF suspension in step (3) is 0.5-1.5 g:1 mL.

According to the invention's preferred embodiment, the concentration of ammonium hydroxide in step (3) is 25-28 wt %; the ratio of the volume of the ammonium hydroxide to the mass of the phase change material mixture is 0.5-1.5 mL:15 g, and further preferably 0.8-1.0 mL:15 g.

According to the invention's preferred embodiment, the stirring temperature in step (3) is 55-65° C., the stirring time is 20-40 min, and the stirring speed is 500-1000 rpm.

According to the invention's preferred embodiment, the volume ratio of water in the water phase and linseed oil in the oil phase in step (4) is 1:2-4; the temperature of heating and stirring is 55-65° C., the heating and stirring time is 60-120 min, and the stirring speed is 800-1500 rpm.

According to the invention's preferred embodiment, the mass ratio of the shell prepolymer tetraethyl silicate and the phase change material mixture in the water phase in step (4) is 3-5:10. The mass ratio of core material and shell material should be controlled within the aforementioned range, a lower mass ratio of core material and the shell material will not be beneficial for the shell material to cover the core material; a higher mass ratio of the core material to the shell material, the content of core material coated by shell material would be insufficient, which may lead to poor cooling effect According to the invention's preferred embodiment, the reaction temperature in step (4) is 65-75° C., the reaction time is 10-15 h, and the stirring speed is 1000-2000 rpm.

According to invention's preferred embodiment, the washing in step (4) is centrifugal washing with ethanol for 5-8 times; the drying temperature is 50-60° C., and the drying time is 20-30 h.

A phase change microcapsule for drilling fluid cooling is obtained by the above preparation method. The core material of the phase change microcapsule is the mixture of $NaNO_3$ and $KNO_3$, and the shell material is silica; The average particle size of the phase change microcapsule is 1-80 μm, preferably 20-50 μm. The phase transition temperature of the phase change microcapsule is 100-400° C., more preferably 180-260° C.; the phase change latent heat is 100-250 J/g, more preferably 155-200 J/g.

According to the invention, the phase change microcapsule for drilling fluid cooling has great encapsulation efficiency, which can increase the latent heat, and further improve the temperature control capability of the phase change microcapsule. A high encapsulation efficiency may yield a thicker shell of the microcapsule, and cause a low cooling effect of the core material. On the other hand, a low encapsulation efficiency might result in a thin shell material that may easily be damaged under high temperature conditions, resulting in leakage of the core material and unstable microcapsule structure. Preferably, the encapsulation efficiency of the phase change microcapsule is 60-80%. In this invention, the encapsulation efficiency refers to the ratio of the phase change latent heat of the core material to the phase change latent heat of the phase change microcapsule.

The phase change microcapsule in this invention was used in water-based drilling fluids, based on the total weight of the water-based drilling fluids, the content of the phase change microcapsule in the water-based drilling fluids is 3-15 wt %, preferably 4-6 wt %.

The Technical Features and Beneficial Effects of the Invention are as Follows

1. The inventor of this invention discovered that drilling operations in ultra-deep formations are faced with severe high and ultra-high temperature problems. The bottom hole temperature can reach more than 200° C. during drilling operations, and the components of the drilling fluid are easily damaged, which can cause a series of problems (e.g., shaft wall instability). Therefore, the invention introduced phase change materials into the drilling fluid components, which can store thermal energy according to changes in their phase states, and adjust the temperature around the material to achieve the goal of cooling. The study found that the phase transition temperature of $NaNO_3$ and $KNO_3$ is similar to those at the bottom of the well when drilling in ultra-deep formations. In addition, the latent heat of the phase change material ($NaNO_3$ and $KNO_3$) is large. Therefore, the $NaNO_3$ and $KNO_3$ can be used as the core material, and their mass ratio can be adjusted to regulate the phase transition temperature. The shell material used is silicon dioxide, and the phase change microcapsule with different shell core ratios was prepared with a specific surfactant. The phase change microcapsule prepared in this invention has an excellent cooling effect, which can significantly reduce the drilling fluid temperature during ultra-deep drilling operations.
2. In this invention, the phase change microcapsule with high phase change temperature was prepared through the Pickering emulsion template method, which was co-stabilized by a traditional surfactant and CNFs. The property of the phase change microcapsule improved by adjusting the mass ratio between the two core materials and the mass ratio between the core material and shell material. In addition, compared with traditional surfactants, the network structure of CNFs is easier to capture emulsion droplets and encapsulate more core materials into the shell material, thus improving the thermodynamic properties of phase change microcapsules. Moreover, the high mechanical strength of CNFs has a great reinforcing effect on the shell material, which can increase the mechanical strength of the phase change microcapsule and prevent it from rupturing in harsh environments such as high temperature and pressure. A specific concentration of CNFs was added in this invention, which made the performance of phase change microcapsule more efficient compared with other traditional surfactants.
3. The phase change microcapsules of the invention have good compatibility with water-based drilling fluids and have no negative impact on the drilling fluid. After adding the phase change microcapsules, the rheology, filter loss, and other properties of the drilling fluid were not affected.

BRIEF DESCRIPTION OF DRAWINGS

FIG. shows the temperature variation curve against time of the drilling fluid added with phase change microcapsule prepared in Examples 1-5.

DETAILED DESCRIPTION OF INVENTION

The invention will be further described with the following examples.

The endpoints and any values disclosed herein are not limited to the exact range or value, and these ranges or values should be understood as containing values close to these ranges or values. For numerical ranges, the endpoint values of each range, the endpoint values of each range, and individual point values, as well as individual point values, can be combined to obtain one or more new numerical ranges, which should be considered specifically disclosed in this invention.

In the following examples: the phase change temperature, latent heat and encapsulation rate of the phase change microcapsule were calculated through the DSC test; the apparent viscosity (AV, mPa·s), plastic viscosity (PV, mPa·s) and dynamic shear force (YP, Pa) of water-based drilling fluids were evaluated by using a six-speed viscometer and following the method specified in GB/T29170-2012; The filtration loss (API, mL) of water-based drilling fluids was determined by API fluid loss test kit according to the method specified in GB/T29170-2012.

Materials Used in the Examples tetraethyl silicate (TEOS), span 80, tween 80, $NaNO_3$, $KNO_3$, and linseed oil were purchased from Aladin Co., Ltd (Shanghai, China);

Ethanol, bentonite (BT), and anhydrous sodium carbonate were purchased from Sinopharm Chemical Reagent Co., Ltd (Shanghai, China);

The CNF suspension was prepared by the method described as follows:

1 g of the *eucalyptus* fibers was dispersed in 100 mL solution containing 0.016 g TEMPO, 0.1 g NaBr, and 6.8 g NaClO (5.2%) solution, stirred for 4 h under room temperature, The pH of the system was maintained at 10-10.5 by adding NaOH (20%) and HCl (0.1 mol/L), when the reaction ended, excess ethanol was added to the suspension to quench the reaction. The obtained mixture was repeatedly washed with deionized water via centrifugation (6000 rpm, 5 min) until pH was near neutral. Then, the CNF suspensions with a concentration of 0.01 g/mL was obtained via a mechanical sonification process (800 W, 45 min).

Example 1

The preparation method of a phase change microcapsule for drilling fluid cooling includes the following steps:
(1) The $NaNO_3$ and $KNO_3$ were mixed at a mass ratio of 3:2, and dried at 160° C. for 12 h then placed in a muffle furnace at 450° C. to melt for 10 h, after the mixture cooled to room temperature, a crystalline mixture was formed. Next, using a crucible, the crystalline mixture was ground and passed through a 100-mesh sieve to obtain the PCM mixture.

(2) 0.27 g span80 was added to 45 mL flaxseed oil, and the mixture was stirred at 60° C. for 30 min to obtain the oil phase, the mixing speed was 1500 rpm.

(3) The PCM mixture obtained in step (1) of 15 g was dispersed in 15 mL 0.01 g/mL CNF suspension. After the PCM mixture was completely dissolved, 0.9 mL ammonium hydroxide (28 wt %) was added into the system, and then stirred at 60° C. for 30 min to obtain the aqueous phase, the mixing speed was 800 rpm.

(4) The water phase in step (3) was poured into the oil phase in step (2) and stirred at 60° C. for 90 min with the stirring speed of 1000 rpm to obtain the W/O emulsion.

(5) 4.5 g TEOS was added slowly drop by drop (dropping speed is 0.2 g/min) into the W/O emulsion obtained in step (4), then stirred at 70° C. for 12 h with the stirring speed of 1500 rpm. After the reaction was completed, the mixture was repeatedly washed with ethanol 5 times via centrifugation (5000 rpm, 8 min), the sediment obtained after centrifugation was dried at 50° C. for 24 h, and the phase change microcapsule with high temperature used for cooling drilling fluid was obtained, which consisted of $NaNO_3$ and $KNO_3$ as core material and silicon dioxide as shell material.

In example 1, the volume ratio of the oil phase and water phase was 3:1, the concentration of CNF suspension was 0.01 g/mL, the mass ratio of $NaNO_3$ and $KNO_3$ was 3:2, and the mass ratio of core material and shell material was 10:3, the particle size, phase change temperature, encapsulation efficiency and latent heat of the phase change microcapsule for drilling fluid cooling were 42 μm, 236° C., 76%, and 192 J/g, respectively.

Example 2

The preparation method of a phase microcapsule for drilling fluid cooling is as described in example 1, except that the TEOS added in step (5) is 6 g.

In example 2, the volume ratio of the oil phase and water phase was 3:1, the concentration of CNF suspension was 0.01 g/mL, the mass ratio of $NaNO_3$ and $KNO_3$ was 3:2, and the mass ratio of core material and shell material was 10:4, the particle size, phase change temperature, encapsulation efficiency and latent heat of the phase change microcapsule for drilling fluid cooling were 40 μm, 212° C., 73%, and 186 J/g, respectively.

Example 3

The preparation method of a phase microcapsule for drilling fluid cooling is as described in example 1, except that the TEOS added in step (5) is 7.5 g.

In example 3, the volume ratio of the oil phase and water phase was 3:1, the concentration of CNF suspension was 0.01 g/mL, the mass ratio of $NaNO_3$ and $KNO_3$ was 3:2, and the mass ratio of core material and shell material was 10:5, the particle size, phase change temperature, encapsulation efficiency and latent heat of the phase change microcapsule for drilling fluid cooling were 40 μm, 179° C., 64% and 163 J/g, respectively.

Example 4

The preparation method of a phase microcapsule for drilling fluid cooling is as described in example 2, except that the mass ratio of $NaNO_3$ and $KNO_3$ in step (1) is 3:3.

In example 4, the volume ratio of the oil phase and water phase was 3:1, the concentration of CNF suspension was 0.01 g/mL, the mass ratio of $NaNO_3$ and $KNO_3$ was 3:3, and the mass ratio of core material and shell material was 10:4, the particle size, phase change temperature, encapsulation efficiency and latent heat of the phase change microcapsule for drilling fluid cooling were 40 μm, 221° C., 75%, and 189 J/g, respectively.

Example 5

The preparation method of a phase microcapsule for drilling fluid cooling is as described in example 2, except that the mass ratio of $NaNO_3$ and $KNO_3$ in step (1) is 3:4.

In example 5, the volume ratio of the oil phase and water phase was 3:1, the concentration of CNF suspension was 0.01 g/mL, the mass ratio of $NaNO_3$ and $KNO_3$ was 3:4, and the mass ratio of core material and shell material was 10:4, the particle size, phase change temperature, encapsulation efficiency and latent heat of the phase change microcapsule for drilling fluid cooling were 41 μm, 230° C., 74%, and 196 J/g, respectively.

Example 6

This example studies the effect of the concentration of CNFs added on the properties of the obtained W/O emulsion.

The preparation of W/O emulsion is as described in example 1, except that the concentration of CNF suspension is changed to 0.006 g/mL, 0.008 g/mL, and 0.01 g/mL respectively.

The results are shown as follows: with the concentration of CNF suspension decreased from 0.01 g/mL to 0.006 g/mL and 0.008 g/mL, the average diameter of droplets increased from 22 μm to 77 μm and 53 μm, respectively. In addition, oil in the emulsion spillage occurred after the emulsion stranded for 12 h when the concentration of CNF suspension was 0.006 g/mL and 0.008 g/mL. However, the emulsion maintained great homogeneity when the concentration of CNF suspension was 0.01 g/mL.

Comparative Example 1

The preparation method of a phase microcapsule for drilling fluid cooling is as described in example 1, except that the TEOS added in step (5) is 2.5 g.

In comparative example 1, the volume ratio of the oil phase and water phase was 3:1, the concentration of CNF suspension was 0.01 g/mL, the mass ratio of $NaNO_3$ and $KNO_3$ was 3:2, and the mass ratio of core material and shell material was 6:1. Due to the insufficient amount of TEOS, incomplete silica shell formed over the surface of the core material, which caused the core material to be dissolved in water and to be washed away during the centrifugation hence no solid particles were collected.

Comparative Example 2

The preparation method of a phase microcapsule for drilling fluid cooling is as described in example 1, except that the TEOS added in step (5) is 10 g.

In comparative example 2, the volume ratio of the oil phase and water phase was 3:1, the concentration of CNF suspension was 0.01 g/mL, the mass ratio of $NaNO_3$ and $KNO_3$ was 3:2, and the mass ratio of core material and shell material was 3:2. The particle size, phase change temperature, encapsulation efficiency and latent heat of the phase change microcapsule for drilling fluid cooling were 44 μm, 144° C., 53%, and 135 J/g, respectively.

Comparative Example 3

The preparation method of a phase microcapsule for drilling fluid cooling is as described in example 1, except that the ammonium hydroxide added in step (3) is 0.3 mL.

Ammonium hydroxide works as a catalyst during the synthesis process of phase change microcapsules and has a significant influence on the hydrolysis and condensation rate of the silica precursor (TEOS), which can determine the formation and characteristics of the silica shell. An appropriate content of ammonium hydroxide added to the system can keep the concentration of silica oligomers above the critical shell formation value. However, when the amount of ammonium hydroxide added was 0.3 mL, the catalytic effect was not enough to form a silica shell, and only formed silicon dioxide clusters. Therefore, no solid particles were collected after drying.

Comparative Example 4

The preparation method of a phase microcapsule for drilling fluid cooling is as described in example 1, except that in step (3), an equal concentration of tween80 aqueous solution is used to replace CNF suspension.

In comparative example 4, the particle size, phase change temperature, encapsulation efficiency, and latent heat of the phase change microcapsule for drilling fluid cooling were 45 μm, 203° C., 50% and 128 J/g, respectively.

The particle size, phase change temperature, latent heat and encapsulation efficiency of the phase change microcapsule prepared in example 1-5 and comparative example 1-4 are shown in Table 1:

TABLE 1

The particle size, phase change temperature, latent heat, and encapsulation efficiencyof the phase change microcapsule

| Samples | Particle Size | Phase Change Temperature | Latent Heat | Encapsulation Efficiency |
|---|---|---|---|---|
| Example 1 | 42 μm | 236° C. | 192 J/g | 76% |
| Example 2 | 40 μm | 212° C. | 186 J/g | 73% |
| Example 3 | 40 μm | 179° C. | 163 J/g | 64% |
| Example 4 | 40 μm | 221° C. | 189 J/g | 75% |
| Example 5 | 41 μm | 230° C. | 196 J/g | 74% |
| Comparative Example 1 | — | — | — | — |
| Comparative Example 2 | 44 μm | 144° C. | 135 J/g | 53% |
| Comparative Example 3 | — | — | — | — |
| Comparative Example 4 | 45 μm | 203° C. | 128 J/g | 50% |

From Table 1, we found that the particle size of the phase change microcapsule prepared in examples 1-5, and comparative examples 1-4 have no significant difference, the particle size ranges from 40 μm to 45 μm, indicating that the mass ratio of core material and shell material and NaNO$_3$ and KNO$_3$ content in the core material does not affect the particle size. However, the mass ratio of core material and shell material has a great influence on the phase change temperature, latent heat, and encapsulation efficiency of the phase change microcapsule. With the mass ratio of core material and shell material decreased from 10:3, 10:4 to 10:5, the thickness of the shell formed increased, which hindered the heat transfer of the core material. Therefore, the phase change temperature of the microcapsule decreased from 236° C. to 212° C. and 179° C., the latent heat decreased from 192 J/g to 186 J/g and 163 J/g, and the encapsulation efficiency decreased from 76% to 73% and 64%. In addition, excessive TEOS causes unreacted silica deposited on the surface of the shell material, which can lead to decrease in the encapsulation efficiency. The insufficient content of TEOS lead to incomplete encapsulation and no phase change microcapsule formed. The mass ratio of NaNO$_3$ and KNO$_3$ has a great influence on the phase change temperature and latent heat of the phase change microcapsule. The microcapsule has higher phase change temperature and latent heat when the content of KNO$_3$ is larger than NaNO$_3$, which is contributed to their different thermodynamic properties. The phase change temperature and latent heat of NaNO$_3$ is 307° C. and 172 J/g, while for KNO$_3$ it is 333° C. and 266 J/g respectively. Therefore, the phase change temperature of the microcapsule can be adjusted by regulating the mass ratio of NaNO$_3$ and KNO$_3$, which allows it to be consistent with the bottom hole temperature during drilling in ultra-deep formations, thus achieving a temperature control effect.

Test Example 1

The effect of phase change microcapsules on rheology and filtration properties of the base slurry after aging.

Preparation of base slurry: 100 parts by weight of water, 2 parts by weight of sodium-based BT, and 1 part by weight of anhydrous sodium carbonate. Mixed and stirred at 8000 rpm for 2 h at room temperature, then sealed and rested for 24 h to obtain the base slurry.

Preparation of drilling fluid: Added the phase change microcapsule prepared by example 1-5 into the base slurry, stirred at 6000 rpm for 30 min. The content of microcapsule in the drilling fluid was 5 wt %.

The drilling fluid prepared above was placed in a roller-heating furnace and aged at 200° C. for 16 h. The rheological and filtration properties of the drilling fluid were tested according to the American Petroleum Institute (API) standard (API RP 13B 12009);

The rheology and filtration properties of the drilling fluid added with different content of phase change microcapsule (0 wt % and 5 wt %) are shown in Table 2.

TABLE 2

Effect of phase change microcapsules on rheology and filtration properties of aged base slurry

| Drilling Fluid Formula | Apparent Viscosity (mPa · s) | Plastic Viscosity (mPa · s) | Dynamic Shear Force (Pa) | API Filter Loss (ml) |
|---|---|---|---|---|
| Base slurry | 42 | 27 | 14.4 | 9.3 |
| Base slurry + 5 wt % example 1 | 44 | 28 | 15.3 | 8.4 |
| Base slurry + 5 wt % example 2 | 46 | 31 | 14.4 | 8.6 |
| Base slurry + 5 wt % example 3 | 43 | 26 | 16.3 | 8.3 |
| Base slurry + 5 wt % example 4 | 47 | 29 | 17.2 | 8.5 |

TABLE 2-continued

Effect of phase change microcapsules on rheology and filtration properties of aged base slurry

| Drilling Fluid Formula | Apparent Viscosity (mPa · s) | Plastic Viscosity (mPa · s) | Dynamic Shear Force (Pa) | API Filter Loss (ml) |
|---|---|---|---|---|
| Base slurry + 5 wt % example 5 | 45 | 27 | 17.2 | 8.7 |

From Table 2, the result show that the apparent viscosity and plastic viscosity of drilling fluid added with 5 wt % were increased slightly, which is related to the fact that the addition of phase change microcapsules increases the solid content of drilling fluid. However, the properties of the drilling fluid have no significant difference after the microcapsule was added, which means that there is good compatibility between phase change microcapsules and drilling fluids. In addition, the filter loss of drilling fluid decreases after added phase change microcapsules, which is beneficial for reducing the permeability of drilling fluid to the formation, preventing the hydration of wellbore clay, and improving wellbore stability.

Test Example 2

The research on temperature control performance of phase change microcapsules

Dispersed the phase change microcapsules prepared in examples 1-5 into the base slurry (preparation method is the same as test example 1 to obtain the drilling fluid (the concentration of phase change microcapsules in the drilling fluid is 5 wt %), The mixture was heated up to 210° C., and record the temperature value every 5 min, the experimental results are shown in FIG. 1.

From FIG. 1, the result show that the heating rate of the drilling fluid decreased significantly compared to the base slurry after the phase change microcapsule was added, indicating that the phase change microcapsules have excellent cooling effect. In addition, the mass ratio of core and shell materials in phase change microcapsules has a significant impact on the temperature control performance of drilling fluid. When the microcapsule prepared in example 3 was added to the drilling fluid, the heating rate was the fastest, which is related to the excessive addition of TEOS that caused the shell of the microcapsule formed to be too thick, and hindered the heat transfer of the core material; When microcapsule prepared in example 1 was added to the drilling fluid, the insufficient addition of TEOS resulted in the phase change microcapsule shell being too thin and the mechanical strength of the microcapsule being poor. When the temperature was raised to a certain value, the shell of the microcapsule was damaged, leading to the leakage of the core material, and further decrease the cooling effect. When the microcapsule prepared in example 2 added to the drilling fluid, the content of TEOS is optimal, and the heat transfer of core material inside the microcapsule was not affected by the shell material. Moreover, the shell of the microcapsule had great mechanical strength to protect its internal core material from leakage, the cooling effect of the drilling fluid was the best. When the microcapsule prepared in example 4 and example 5 were added to the drilling fluid, the cooling effect was not significantly different from that in example 2, indicated that the mass ratio of $NaNO_3$ and $KNO_3$ had no significant impact on its temperature control performance.

What is claimed is:

1. A preparation method of a phase change microcapsule for drilling fluid cooling comprises the following steps:
   (1) drying, heating and melting, cooling and grounding core materials of $NaNO_3$ and $KNO_3$ to obtain a phase change material mixture; and the mass ratio of $NaNO_3$ to $KNO_3$ in the phase change material mixture is 3:1-5;
   (2) adding emulsifier into a linseed oil, then heating and stirring to obtain an oil phase; the emulsifier is sorbitan oleate, and the concentration of the emulsifier in the oil phase is 1-10 mg/mL;
   (3) adding the phase change material mixture into a suspension of cellulose nanofibers (CNFs), then stirring followed by adding ammonium hydroxide to obtain a water phase; the concentration of the suspension of CNFs is 0.006-0.01 g/mL; the ratio of the mass of phase change material mixture to the volume of the suspension of CNFs is 0.5-1.5 g: 1 mL; the concentration of ammonium hydroxide is 25-28 wt %; the ratio of the volume of the ammonium hydroxide to the mass of the phase change material mixture is 0.5-1.5 mL:15 g;
   the suspension of CNFs is prepared according to the following method:
   dispersing an *eucalyptus* powder into deionized water, and adding 2,2,6,6-tetramethylpiperidine oxide (TEMPO), sodium bromide and sodium hypochlorite solution to yield a mixture, stirring the mixture at room temperature for 4 h; then adding 0.1 mol/L of hydrochloric acid solution and 10-30% of sodium hydroxide solution by weight to adjust pH to 10-10.5 to yield a mixed solution 1; adding three times of the mixed solution 1 of ethanol by volume to yield a mixed solution 2; wherein the mass ratio of the *eucalyptus* powder to the volume of deionized water is 1 g:100 mL, the mass ratio of TEMPO to the *eucalyptus* powder is 0.01-0.02:1, the mass ratio of sodium bromide to the *eucalyptus* powder is 0.05-0.15:1, the mass ratio of sodium hypochlorite solution to the *eucalyptus* powder is 6-7:1, and the mass fraction of sodium hypochlorite solution is 5-6%; then centrifuging the mixed solution 2 and collecting a sediment, dispersing the sediment to deionized water, and performing an ultrasonic treatment to obtain the suspension of CNFs; the concentration of the suspension of CNFs is 0.006-0.01 g/mL; the power of the ultrasonic treatment is 800 W; the ultrasonic treatment time is 30-60 min; and
   (4) mixing the water phase and the oil phase, heating and stirring to form a water-in-oil (W/O) emulsion; then adding tetraethyl silicate into the W/O emulsion for a reaction at 65-75° C. for 10-15 h to yield a reaction product, centrifugating, washing and drying the reaction product to obtain the phase change microcapsule; wherein the mass ratio of the tetraethyl silicate and the phase change material mixture in the water phase is 3-5:10; the volume ratio of water in the water phase and the linseed oil in the oil phase is 1:2-4;
   wherein the phase change microcapsule has a phase change temperature at 212-236° C., a latent heat between 186-196 J/g, and an encapsulation efficiency between 73-76%.

2. The preparation method according to claim 1, wherein the mass ratio of $NaNO_3$ and $KNO_3$ in the phase change material mixture in the step (1) is 3:2-4.

3. The preparation method according to claim 1, wherein the drying temperature in the step (1) is 150-170° C., and the drying time is 10-15 h;

the heating and melting temperature in step (1) is 400-500° C., and the heating and melting time is 8-12 h; the cooling is natural cooling to room temperature.

4. The preparation method according to claim 1, wherein the concentration of the emulsifier in the oil phase in the step (2) is 5-8 mg/mL, the temperature of the heating and stirring is 55-65° C., the time of the heating and stirring is 20-40 min, and the speed of the heating and stirring is 1000-2000 rpm.

5. The preparation method according to claim 1, wherein the ratio of the volume of the ammonium hydroxide to the mass of the phase change material mixture in the step (3) is 0.8-1.0 mL:15 g, the stirring temperature in step (3) is 55-65° C., the stirring time is 20-40 min, and the stirring speed is 500-1000 rpm.

6. The preparation method according to claim 1, wherein the temperature of the heating and stirring in the step (4) is 55-65° C., the time of the heating and stirring is 60-120 min, and the stirring speed is 800-1500 rpm.

7. The preparation method according to claim 1, wherein the stirring speed in the step (4) is 1000-2000 rpm, the washing is centrifugal washing with ethanol for 5-8 times, the drying temperature is 50-60° C., and the drying time is 20-30 h.

* * * * *